(12) United States Patent
Sherwin

(10) Patent No.: US 6,860,531 B2
(45) Date of Patent: Mar. 1, 2005

(54) GRIPPING AND VACUUM END EFFECTOR FOR TRANSFERRING ARTICLES

(75) Inventor: John P. Sherwin, Sussex, WI (US)

(73) Assignee: ABB Inc., Auburn Hills, MI (US)

( * ) Notice: Subject to any disclaimer, the term of this patent is extended or adjusted under 35 U.S.C. 154(b) by 60 days.

(21) Appl. No.: 10/027,238

(22) Filed: Dec. 20, 2001

(65) Prior Publication Data
US 2003/0120387 A1 Jun. 26, 2003

(51) Int. Cl.[7] .............................. B66C 1/02; B25J 15/02
(52) U.S. Cl. ........................... 294/2; 294/64.1; 294/65; 294/103.1; 901/40
(58) Field of Search ........................... 294/2, 64.1, 65, 294/86.4, 119.1, 103.1; 901/37–40

(56) References Cited

U.S. PATENT DOCUMENTS

| | | | | |
|---|---|---|---|---|
| 2,893,581 A | * | 7/1959 | Cushman | 294/64.1 |
| 3,117,815 A | * | 1/1964 | Creskoff | 294/64.1 |
| 3,227,481 A | * | 1/1966 | Creskoff | 294/64.1 |
| 3,411,641 A | | 11/1968 | Dean | 294/64.1 |
| 3,975,045 A | * | 8/1976 | Abarotin et al. | 294/86.4 |
| 3,976,205 A | * | 8/1976 | Goransson | 294/64.1 |
| 4,516,762 A | * | 5/1985 | Moltrasio et al. | 414/797 |
| 4,635,988 A | * | 1/1987 | Potters et al. | 294/64.1 |
| 4,750,132 A | * | 6/1988 | Pessina et al. | 294/86.41 |
| 4,828,304 A | * | 5/1989 | No et al. | 294/2 |
| 4,911,098 A | * | 3/1990 | Tabata | 294/67.33 |
| 5,088,878 A | * | 2/1992 | Focke et al. | 294/64.1 |
| 5,222,861 A | | 6/1993 | Focke et al. | 294/65 |
| 5,727,832 A | | 3/1998 | Holter | 294/64.1 |
| 5,984,623 A | | 11/1999 | Smith et al. | 294/65 |

FOREIGN PATENT DOCUMENTS

| | | | | |
|---|---|---|---|---|
| DE | 2263477 | * | 7/1993 | 294/64.1 |
| FR | 2.579190 | | 9/1986 | 294/64.1 |
| JP | 403032586 | * | 2/1991 | 414/797 |

* cited by examiner

Primary Examiner—Eileen D. Lillis
Assistant Examiner—Paul T. Chin
(74) Attorney, Agent, or Firm—Ryan Kromholz & Manion, S.C.

(57) ABSTRACT

An end effector for a robot is used to unpack flattened stackable items from a container using a fixed sized vacuum plenum and simple adjustable gripping elements. The gripping elements comprise a pair of adjustable, smooth blades. In addition, the end effector includes mechanisms for retaining and transporting the container.

5 Claims, 9 Drawing Sheets

GRIPPING AND VACUUM END EFFECTOR FOR TRANSFERRING ARTICLES

BACKGROUND OF THE INVENTION

The present invention relates to devices for transferring items from a first location to second location. More particularly, the invention relates to an end effector for a robotic arm. The end effector is capable of removing a stack of relatively flat items from a shipping container and depositing said items at a workstation, conveyor, or directly into an automatic cartoning machine.

In bottling, canning, cosmetics, house wares and other industries, large amounts of packaging material such as folded, flat, paperboard and other such containers must be handled. Typically, such packaging material arrives in relatively bulky and heavy shipping containers or corrugated boxes. The boxes may be stacked on pallets and have spacers between each row of boxes.

In the past, the task of removing the packaging materials from shipping containers has been performed by hand. Because the work is repetitive and the packaging materials are relatively heavy, workplace injuries can be significant when such materials are manually unloaded. Often, many workers must be employed to remove the folded or flattened packaging materials from the shipping crates and place the materials at the appropriate position within one or more workstations. Therefore, attempts have been made to automate this process, thereby alleviating the above noted and unwanted problems.

Thus, a novel end effector for a robot is needed that can transfer generally flat stackable items and simultaneously reduce conventional cycle times, reduce down-time, reduce operating expenses and reduce damage to the items being manipulated.

The prior art recognizes the usefulness of robotic unloading of relatively flat stackable items. For example, U.S. Pat. No. 5,727,832, incorporated herein by reference, also assigned to assignee of the present invention, describes an apparatus for transferring relatively flat items. Despite the success of the '832 patent, the present invention provides significant improvements over the prior system in the areas of improved performance and improved product handling.

SUMMARY OF THE INVENTION

The present invention relates to devices for transferring relatively flat items from a shipping container to a desired location, such as a workstation. More particularly, the present invention relates to an end effector for a known robot, whereby the end effector is capable of holding a stack of relatively flat items so that they may be extracted from a container and moved from one location to another by the motion of a robot arm.

An object of the present invention is to offer a viable solution to inherent drawbacks of manual unloading of relatively flat, stacked items from a container.

A further object of the present invention is to improve the state of the art regarding robotic end effectors by presenting a novel solution that simplifies the number and complexity of components required to satisfactorily remove relatively flat stackable items of interest from shipping container.

Another object of the present invention is to reduce surface marring on items of interest induced by system components that necessarily contact the items.

Yet another object is to provide a vacuum sealing mechanism, such as a surround seal about the selected items that is less susceptible to premature wear.

It is another object of the present invention to provide a means for capturing and removing the shipping carton containing the relatively flat stackable items of interest.

The success of the present invention is due, in part, to the simplicity of its design and execution, wherein fewer and more reliable components are arranged in a novel manner that results in more reliable performance and lower operating cost.

One aspect of the present invention is the ability of the invention to be easily adapted for use on most conventional robots. The novel end effector is attached to a known robotic arm by a means understood in the art. Once configured, the end effector may rotate about a radial axis, while movement about the x, y, and z axes may be affected by the robot arm and base.

The present invention uses a vacuum plenum dimensioned for the items of interest. The size of the plenum is easily modified for different products. A quick changeover feature of the end effector is also contemplated. A soft foam-like surround or seal provides the necessary flexibility and sealing means to maintain the desired vacuum within the plenum.

The vacuum plenum cooperates with gripping elements to grasp the relatively flat items, thus facilitating lifting of the items from an outer container. The vacuum plenum is used in a manner understood in the art whereby air is drawn past the surround and the items of interest to create a negative pressure region within a chamber. This negative pressure region, in combination with the force exerted by the gripping elements, maintains the attraction and retention of the items of interest to the end effector.

A pair of gripping elements is utilized to assist with the removal of the items from the container. The elements are mounted on opposite sides of the vacuum chamber. One of the gripping elements may be adjustable in relation to the second gripping element, which may be stationary or fixed in position. The gripping elements cooperate whereby at least one, preferably, is biased or moved toward the other.

The gripping elements in a preferred embodiment may comprise of a pair of smooth surfaced gripping blades. The gripping blades, for example, are substantially flat members with a surface finish that is smooth so that the items of interest will not be marred when grasped between the pair of gripping blades. It should be noted that the gripping blades do not incorporate vacuum means, as taught in the prior art. The lack of vacuum means in the gripping blades accomplishes a similar function of the prior known blades without the added complexity of providing vacuum lines and the associated complexity and necessary components to the gripping blades. Moreover, the smooth finish and lack of vacuum means results in handling of the items in a manner that eliminates surface marring of the items. Further, the novel design reduces complexity, eliminating some components and generally reduces operating cost.

The novel end effector may optionally include a means to relocate the outer shipping container during manipulation and extraction of the items of interest. For example, a piercing point or in the preferred embodiment, a pair of retractable piercing points may be used to grasp an exterior wall of the outer or shipping container and physically lift and relocate the shipping container.

Additionally, the novel end effector may include additional suction means whereby, upon removal of the relatively flat items of interest, the now empty shipping container may be discarded in an automated manner. To that end, the novel end effector may optionally include additional suction means whereby the empty container is attracted to the novel end effector and releasably engaged by the effector. In this manner, it will be understood that the empty shipping container may be discarded in an appropriate location.

DESCRIPTION OF THE DRAWINGS

FIGS. 5–11, inclusive, generally illustrate a sequence of steps whereby the end effector grasps the stackable items of interest retained within a container. Specifically.

DETAILED DESCRIPTION

Although the disclosure hereof is detailed and exact to enable those skilled in the art to practice the invention, the physical embodiments herein disclosed merely exemplify the invention that may be embodied in other specific structure. While the preferred embodiment has been described, the details may be changed without departing from the invention, which is defined by the claims.

Referring generally to FIGS. 1–10, inclusive, similar items are numbered alike. The novel end effector of the present invention is referred generally by the numeral 20.

Figure 1:
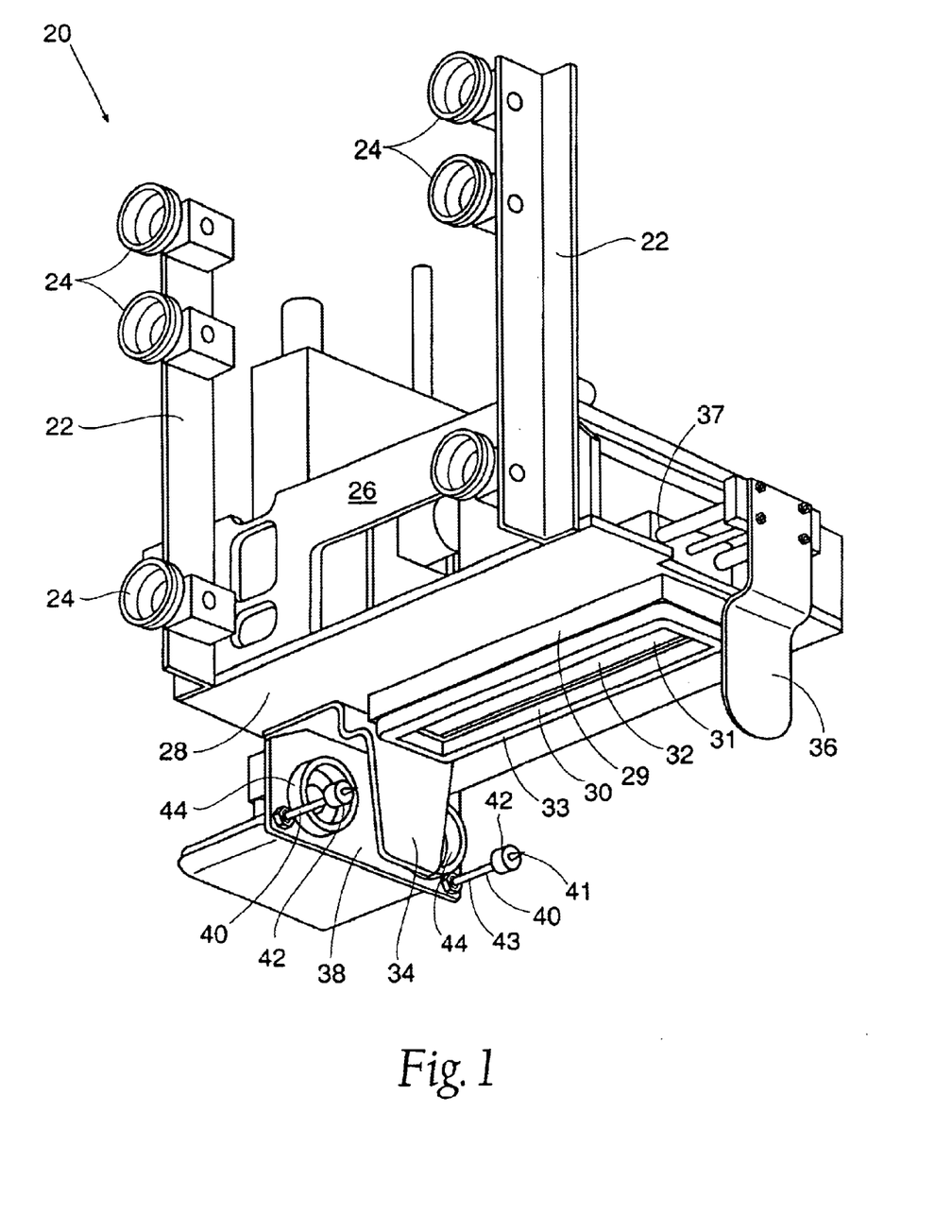
FIG. 1 is a perspective view of the underside of the end effector of the present invention
Figure 2:
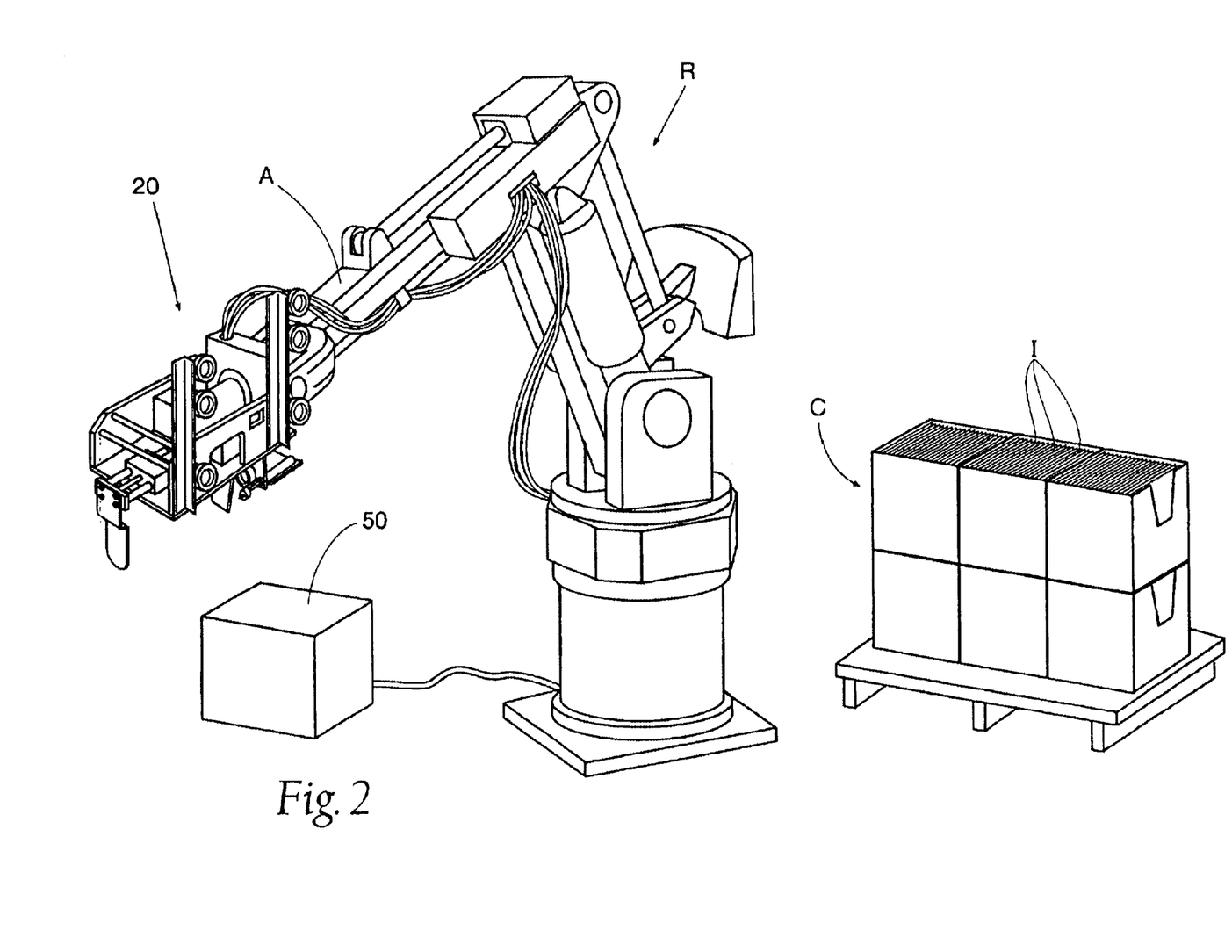
FIG. 2 is a perspective, environmental view of the end effector of the present invention shown mounted to a known robot.

With reference to FIGS. 1 and 2, it will be observed that the present invention comprises an improved end effector 20 mounted on the arm A of a conventional multiple axis industrial robot R for gripping, transporting, and releasing relatively flat items, such as flattened packaging materials. One example of many applications for this end effector 20 is to be used to remove flattened packaging materials such as tissue boxes, cereal boxes or the like from large shipping containers C. While packaging material is noted as the item of interest herein, it is to be expressly understood that end effector 20 could be utilized to grasp, transfer and release any suitable materials.

With particular reference to FIG. 2, the operational environment of the present invention is shown with the end effector apparatus 20. Robot R is a 6-position or 6-axis industrial robot and includes a robot control system 50.

Adjacent the robot R is a stack of shipping containers C. Enclosed within each container C is a plurality of substantially and relatively flat items of interest I.

The present invention 20 is shown in greater detail in the view of FIG. 1. A generally flat plate 28 is mounted to a frame 26. The plate 28, in turn, supports a vacuum chamber, called a vacuum plenum 32. The plenum 32, in a preferred embodiment, is constructed by applying a flexible foam material, such as a surround 30 on a bottom surface of the plate 28. In one embodiment, the plenum 32 includes a surround 30 placed in a generally rectangular pattern whereby the surround 30 forms four sides that are substantially perpendicular to one another. In another embodiment, the surround 30 may be placed in a curvilinear pattern whereby the plenum 32 may take on a circular or elliptical, or generally oval shape.

The surround 30, along with the plate 28, forms the plenum 32 having an opening 31. A substantially flat edge 33 is formed about the opening 31. Attached to the outermost surface of the edge 33 is a surround 30. The surround 30 may be a flexible foam, such as foam neoprene, which provides the required flexibility while maintaining substantial integrity to maintain a vacuum of approximately –10 pounds per square inch (–20 inches of mercury), for example. The plate 28 may be modified to create a larger vacuum volume by increasing the size of the plenum 32. In one embodiment, the plenum 32 may be offset from the mounting plate 28 by a subframe 29 (also shown in FIG. 1) The subframe 29 may have, for example, four walls with each adjacent wall being substantially perpendicular whereby a rectangular frame is formed. In this embodiment, the surround 30 is affixed to the subframe 29, which would be coupled to the plate 28.

Figure 3:
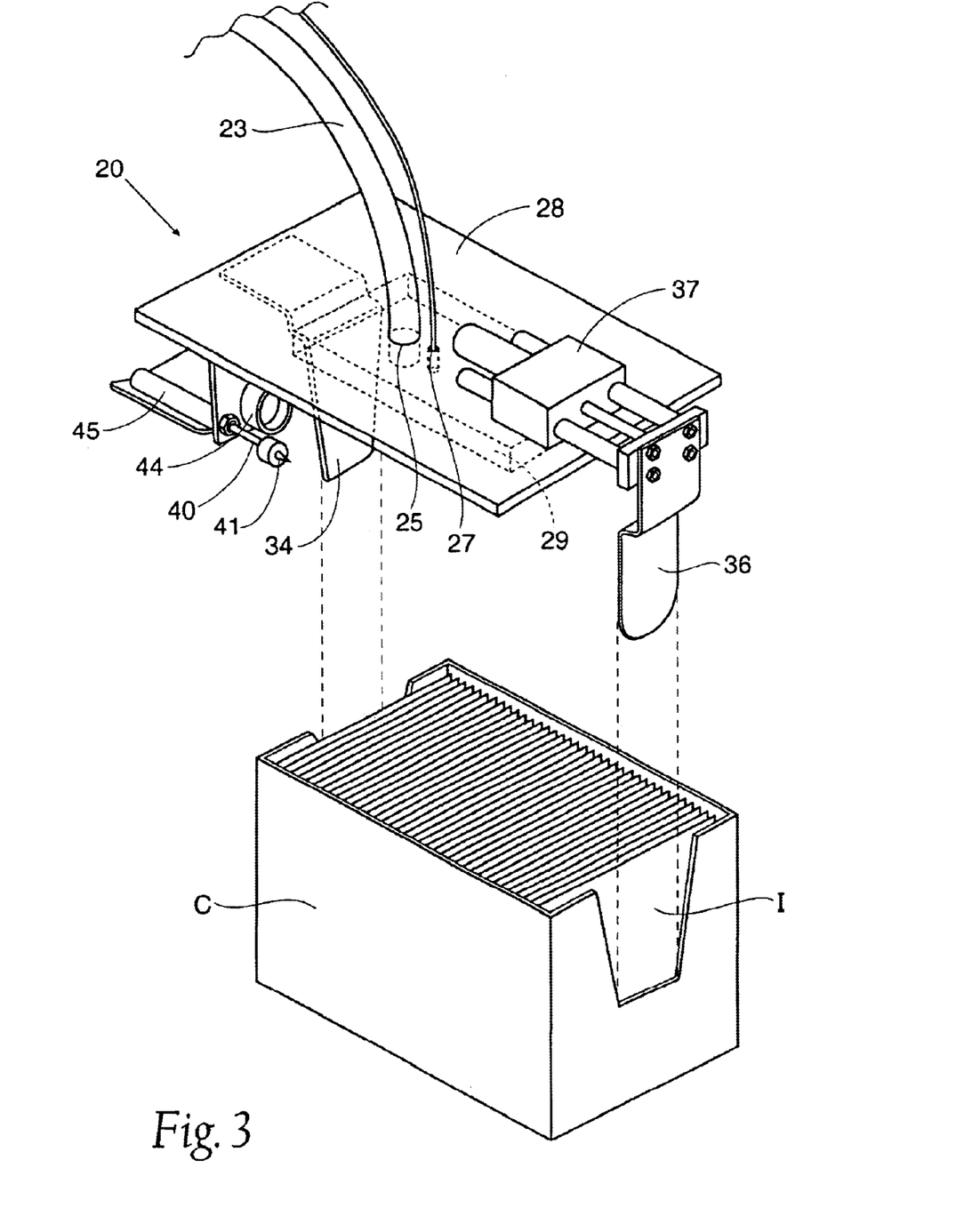
FIG. 3 is a partial, top perspective view of the end effector and a container of interest with notched side panels and generally flat stackable items therein.
Figure 4:
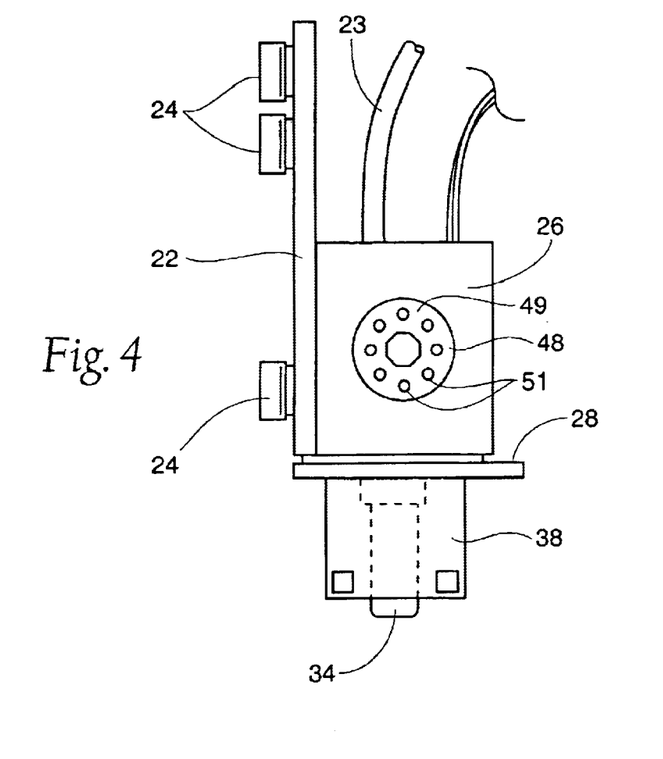
FIG. 4 is an end view of the end effector.

As shown in FIG. 3, a vacuum port 25 passes through the plate 28 at a location that is within the area defined by the subframe 29 and surround 30. It may be understood that the vacuum port 25 may comprise a single aperture, or alternately, multiple apertures, as is commonly known in the prior art. A vacuum line 23 connects the port 25 with an external vacuum source. Thus, the plate 28, the port 25 including the necessary apertures, fittings and the like, along with the surround 30 create a selectable vacuum in the vacuum plenum 32. Also located within the plenum 32 is a vacuum sensor 27. The sensor 27 is electronically connected to the control module or central processing unit (CPU) 50 that is capable of receiving the output generated by the sensor 27.

Referring again particularly to FIG. 1, also mounted to the plate 28 is a first blade 34. The blade 34 may be constructed from, for example, stainless steel, with a polished surface finish to avoid marring of any surfaces of the items of interest I during subsequent manipulation thereof. Alternatively, the blade 34 may be manufactured from traditional steel (hot or cold rolled) or plastic.

Opposite the blade 34 is a second blade 36. The second blade 36 may be of similar construction as the first blade 34, for example, being stainless steel and having a smooth surface finish. The second blade 36 is supported by a linear motion mechanism 37, which, in turn is attached to the plate 28, or alternatively, to the frame 26. The mechanism 37 may comprise, for example, a fluid cylinder and two guide rods, such as a linear slide, as is understood and known in the art. The mechanism 37 controls the movement of blade 36 within a defined range.

An alternative embodiment contemplates that both blades 34 and 36 may be mounted to corresponding means that enables both blades 34 and 36 to move relative to a common fixed position.

Both the first blade 34 and the second blade 36 may share similar geometries. In the preferred embodiment both blades 34 and 36 do not have vacuum means, contrary to the teaching of the prior art. Further, both blades 34 and 36 have substantially smooth finishes with a generous and substantially flat surface. While smooth surface finishes on gripping means, such as blades 34 and 36 may be counter-intuitive, in this application such blades are successful. The smooth finish and lack of vacuum means results in the elimination of surface defects to the substantially flat items I.

The preferred embodiment requires an initial and sustained biasing cooperation between the first blade 34 and the second blade 36 to grip the items I. Compression of the items I by blades 34 and 36 creates a substantially impervious unitary structure which enables the application of a vacuum across its top surface. The preferred embodiment combines the grip of blades 34 and 36 with the negative pressure of the vacuum plenum 32 to provide a reliable and repeatable extraction of the items of interest I from each container C.

In addition to being movable and capable of applying a gripping force to the items I, the second blade 36 has a range of adjustment with relation to the first blade 34. This compensates for the situation where a container C may have only a partial load of items I. Accordingly, the position of blade 36 may be substantially adjusted to compensate for different size containers C and different amounts of items I within a container.

Again as is shown in FIGS. 1 and 3, my preferred embodiment may also include gripping means to selectively reposition each container C prior to and/or during removal of the items I. The gripping means may comprise a pair of piercing points 40 which are mounted to linear actuators 45 for selectively retracting and extending. The actuators preferably include a linear slide 37 (see FIG. 3) and/or a fluid cylinder, as is commonly understood in the art. The controller 50 controls the movement of the actuators 45. The actuators 45 are coupled to a mounting arm 38. The mounting arm 38 is mounted generally perpendicular to the plate 28. In my preferred embodiment the pair of piercing points 40 each include a barbed portion 41 located at an end of a round shaft 43. The barbed portion 41 is adapted to pierce a sidewall of the container C when selectively extended by the linear slide and fluid cylinder 45. To control encroachment of the piercing points 40 toward the mounting arm 38, each point 40 may preferably include a bumper 42 located on the extendable shaft 43 at a predetermined position behind the barbed portion 41.

The outer containers C stacked on a pallet are typically separated in layers by placing a sheet of cardboard between each layer. If the outer containers C sit on the pallet for an extended period of time, the cardboard sheets tend to compress between the layers. It then becomes difficult to horizontally slide or relocate a container C along the sheet of cardboard. Therefore, the piercing points are used to lift each container C from the cardboard sheet before it is repositioned for entry of the blades 34 and 36.

When necessary to transport a container C, the gripping means 40 may include or comprise a vacuum means. For example, and as shown in FIG. 1, a pair of suction cups 44 may be used. The suction cups are coupled to an external vacuum source controlled by the controller 50. The suction cups 44 may be mounted on the mounting arm 38.

Figure 9:
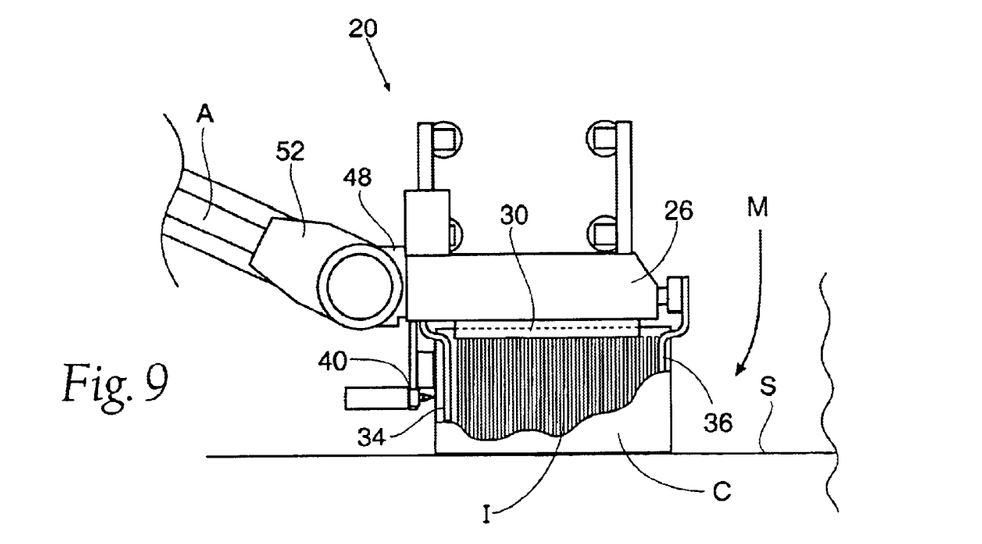
FIG. 9 shows the stackable items of interest grasped between the blades of the end effector of the present invention while the container is retained by the suction cups.

As customary in the robotic arts, the end effector 20 may be rotatably mounted on a robotic arm A so that the effector 20 may rotate about a radial axis. Accordingly, the robot is capable of positioning the end effector 20 at any desired location. Thus, it is understood that the end effector 20 has a varied and useful range of motion. As shown in FIG. 9, a stanchion or wrist spacer 48 is provided to receive the distal end 52 of the robotic arm A. The distal end 49 (see FIG. 4) of the wrist spacer 48 is connected to the frame 26. A plurality of fasteners 51 is used to retain the structures together.

Referring specifically to FIGS. 5–11 (inclusive) a sequence of events is helpful to illustrate the operation, and define the structure of the effector 20. While the sequence of operations facilitates understanding, the precise order of operations is not essential to the invention. A preferred situation is depicted whereby a container C is located on a pallet and grouped with a number of similar containers C, as shown in FIG. 2. Each container C is located in a location that is known by the robot by the controller 50. Each container C contains relatively flat stackable items I (i.e. flattened boxes for a product such as tissues, cereal or other goods).

Figure 5:
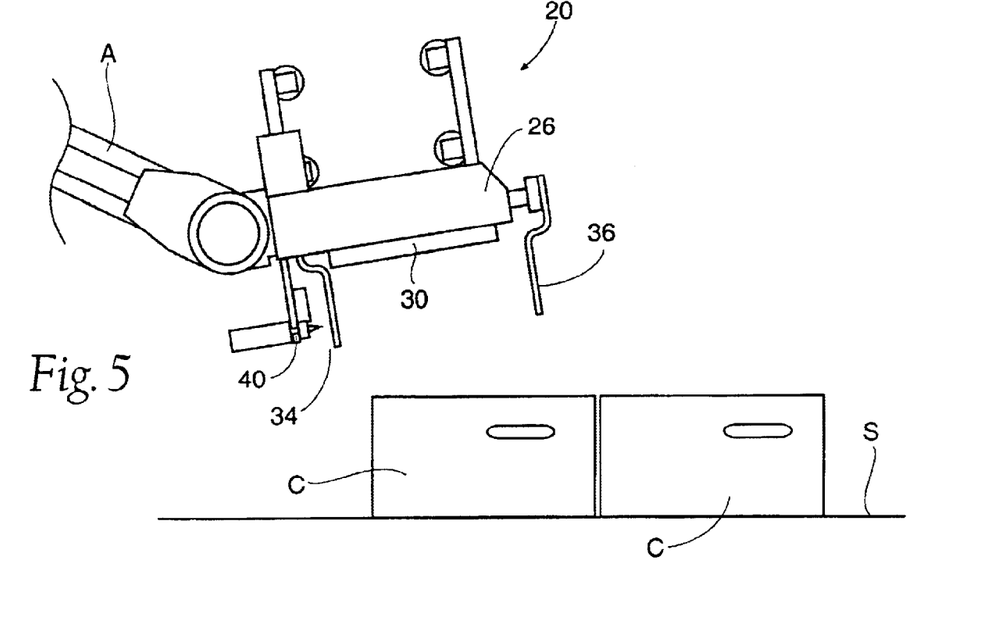
FIG. 5 shows the end effector at an oblique angle as it is positioned to grasp the stackable items in a container.
Figure 6:
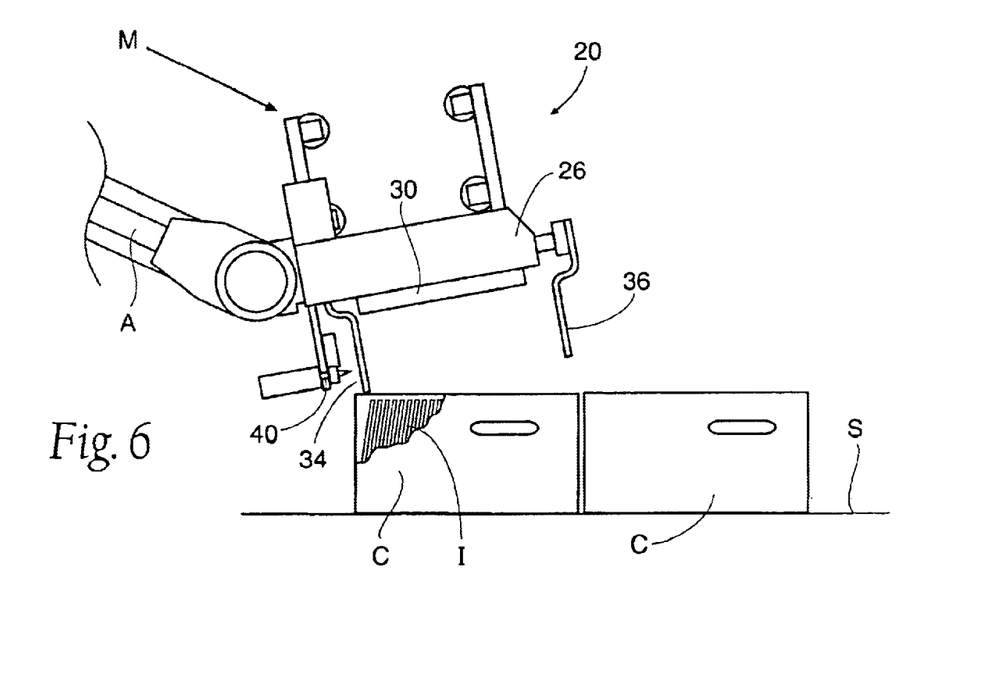
FIG. 6 shows the initial approach into the container, where the first blade is used to push the items of interest forward, creating space to allow the blade to plunge down into the container between the inner wall and stack of items.

Referring specifically to FIGS. 5 and 6, the robot R may present the end effector 20 at an inclined attitude so that the stationary blade 34 may approach the stackable items of interest I and make first contact. It will be noted that the gripping means 40 is in a retracted and/or inactive position. Once the stationary blade 34 makes contact, the position of the movable blade 36 may be adjusted to accommodate the size of the load consisting of the items I. This adjustment may be made by any means known in the art and may include, for example, a sensing means, such as an optical sensor or camera (not shown).

Figure 7:
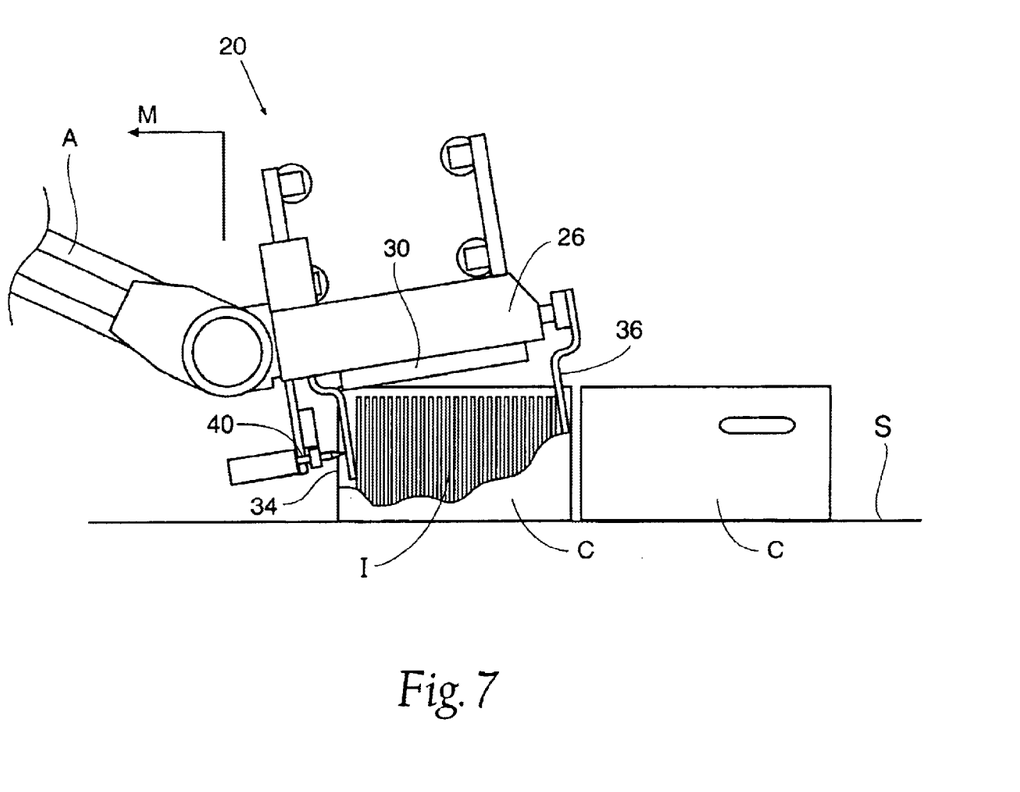
FIG. 7 shows the end effector grasping the stackable items of interest while the spears pierce the container.

As shown in FIG. 7, often it is necessary to relocate or reposition the container C in order to have the required clearance for the end effector 20. Piercing point 40 pierces the sidewall of the container C. Next, the robot arm R lifts and repositions the container as shown by the arrow M to create the required clearance. It is important that the end effector be able to lift the container C as such containers often times deform the cardboard sheets S that separate the layers on the pallet of containers. If the end effector simply applies a substantially vertical force to the container, the container is likely to break before moving. By piercing the container wall, the end effector can lift and draw the container to a predetermined position.

Figure 8:
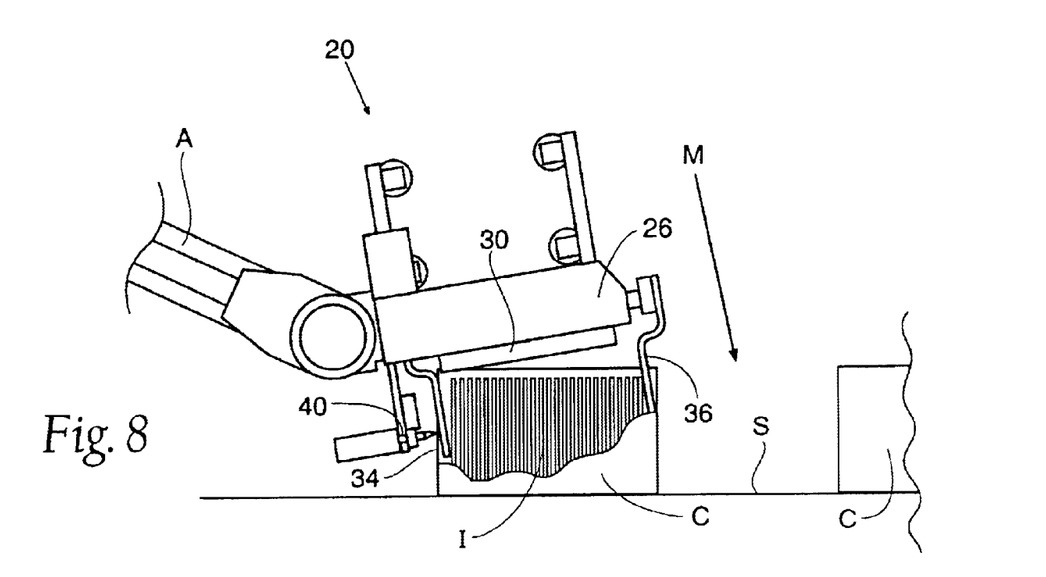
FIG. 8 shows the cooperation of the first and second blades to grasp the items of interest.

Referring now to FIGS. 8 and 9, as the robot R continues to manipulate the end effector 20, a slight rotation of the end effector 20 in the direction of the arrow M may be made so that the movable blade 36 now contacts the items of interest I. The items I are positioned between the blades 34 and 36: The movable blade 36 is biased toward the non-movable blade 34 until a predetermined amount of pressure is exerted upon the items I.

As is clearly shown in FIG. 9, the surround 30 is in substantial contact with the items I. Once substantial contact is made, the vacuum source is activated and a vacuum is drawn through conduit 23. This vacuum will assist in retaining the items I to the end effector 20.

It should be noted that it may be desirable to retain the container C in a fixed location with respect to the end effector 20 during the grasping process. To that end, the end effector 20 includes, in a preferred embodiment, a gripping means 40, as discussed previously. In one embodiment, the gripping means 40 may be selectively extended to capture the container C. It may be desirable, for example, to capture container C during the manipulation of blades 34 and 36 to facilitate proper biasing of the items of interest I. In another embodiment, the gripping means comprises one or more vacuum cups arranged to selectively attach to the container C.

Once the stackable items I are secured between the blades 34 and 36 and a vacuum is applied by the plenum 32, the robot R lifts the end effector 20. The grasped items I are retained by the end effector and the container C falls aside or away.

Figure 10:
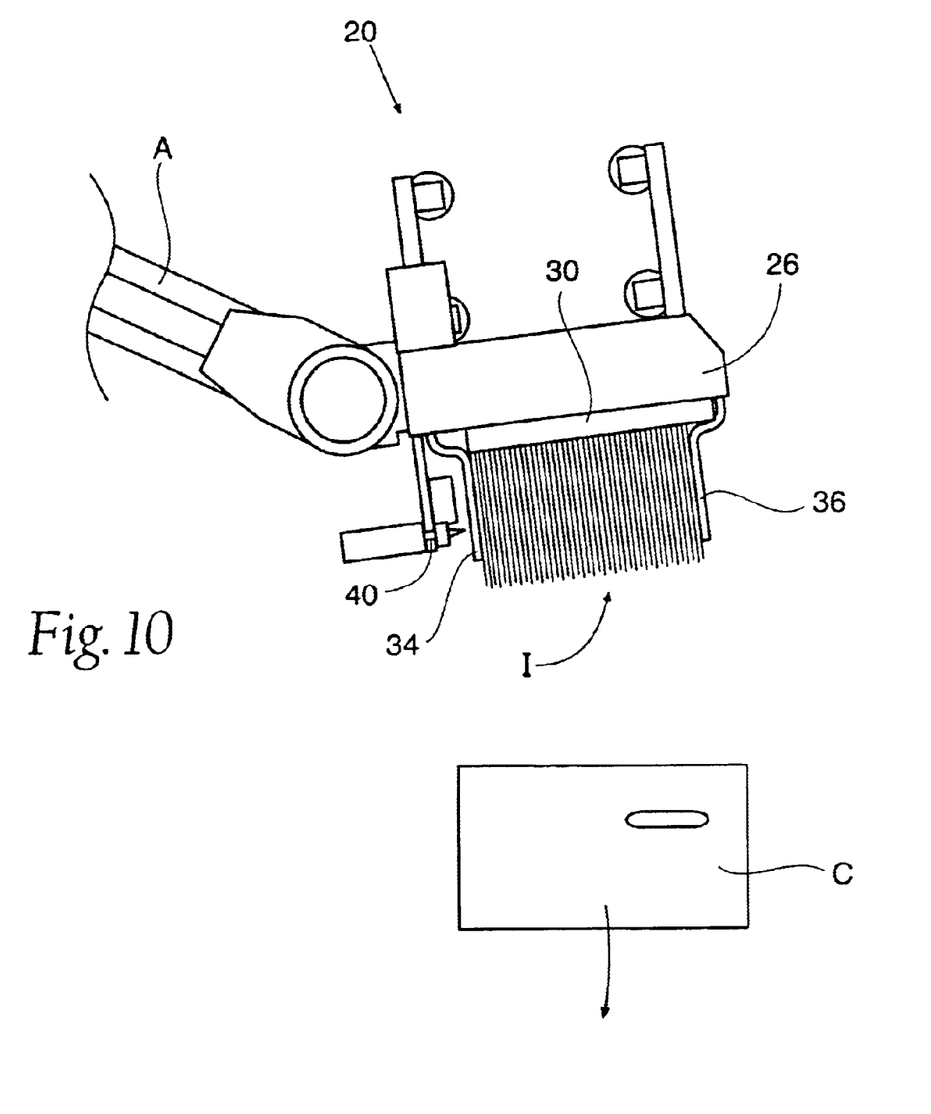
FIG. 10 shows the container being released from the gripping means.
Figure 11:
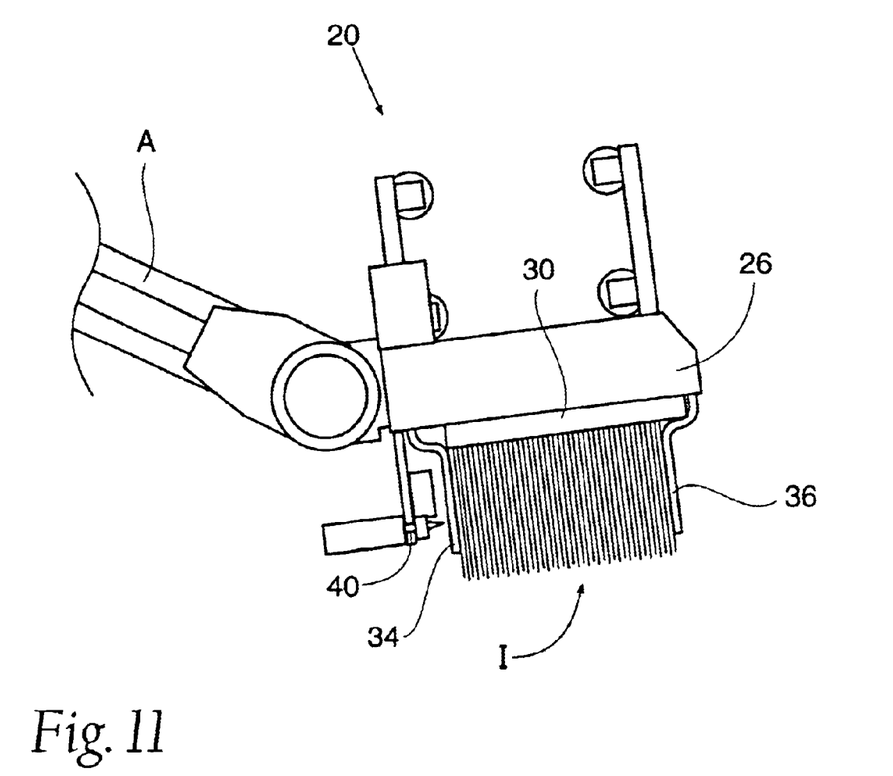
FIG. 11 shows the effector of the present invention holding a load of flattened stackable items of interest after extraction from the container.

Alternatively, and as shown in 10, the robotic arm A may now lift the items I and container C simultaneously. At a predetermined time or at a predetermined location, the gripping means 40 may release the container C whereby the force of gravity allows the container to fall to the ground. As discussed below, an embodiment of the end effector 20 includes additional gripping means for grasping and transporting the empty container to a container disposal area within the robotic work cell.

Figure 12:
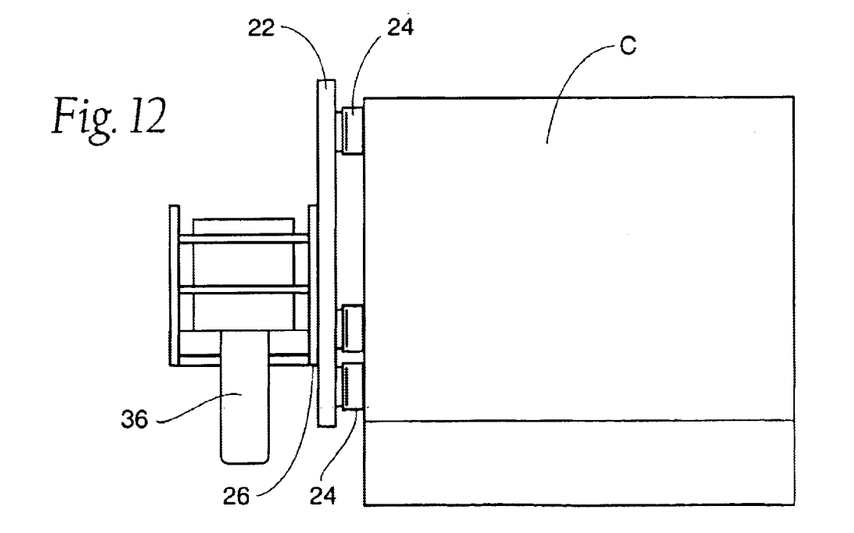
FIG. 12 is another end view of the end effector showing an empty container grasped by its suction cups.

Referring back to FIG. 1 and referring specifically to FIG. 12, the robot R end effector 20 may include a means for grasping and removing an empty container C after the items of interest I are manipulated by the effector 20. A pair of mounting rails 22 is coupled to the frame 26. The mounting rails 22 each hold a plurality of suction means such as vacuum cups 24. In a preferred embodiment, each rail 22 has three vacuum cups 24 in linear spaced relation to each other. Once the end effector is positioned adjacent the empty container C, a vacuum is applied to the vacuum cups 24 and the empty container may thereafter be transported to a predetermined location.

It may be understood that the vacuum cups 24 may be used to attract an empty container C to the effector 20 after the container C has been emptied of stackable items I. Therefore, it is envisioned that the effector 20, after depositing the items I in a desired location, may return and locate the discarded container C, now empty. The effector 20 may be, preferably, positioned by the robot R to approach a sidewall of the container C. Having attained an appropriate attitude, the effector 20 may employ vacuum means to the suction cups 24 and attract the empty container C to the effector and manipulate the empty container C to another location so that it may be properly removed from the workstation.

The foregoing is considered as illustrative only of the principles of the invention. Furthermore, since numerous modifications and changes will readily occur to those skilled in the art, it is not desired to limit the invention to the exact construction and operation shown and described. While the preferred embodiment has been described, the details may be changed without departing from the invention, which is defined by the claims.

What is claimed is:

1. An end effector for a robot, comprising:
   a plate mounted to the robot, said plate having a first surface and an oppositely positioned second surface;
   a vacuum port located on the first surface of the plate and passing through the plate to the second surface, said vacuum port being connected to a vacuum source;
   a surround located on the second surface of the plate, said surround enveloping the vacuum port at the second surface of the plate, said surround comprises a subframe, said subframe located between the surround and the plate;
   a first gripping element mounted to the second surface in substantially perpendicular relationship to the plate, said first gripping element being located outboard the surround;
   a second gripping element positioned in spaced parallel relation opposite the first gripping element whereby said second gripping element is located outboard the surround.

2. An end effector for a robot, comprising:
   a plate mounted to the robot, said plate having a first surface and an oppositely positioned second surface;
   a vacuum port located on the first surface of the plate and passing through the plate to the second surface, said vacuum port being connected to a vacuum source;
   a surround located on the second surface of the plate, said surround enveloping the vacuum port at the second surface of the plate;
   a first gripping element mounted to the surface in substantially perpendicular relationship to the plate, said first gripping element being located outboard the surround;
   a second gripping element positioned in spaced parallel relation opposite the first gripping element whereby said second gripping element is located outboard the surround;
   a pair of parallel mounting rails positioned substantially perpendicular to the plate, each of said parallel mounting rails having a plurality of vacuum cups mounted thereon whereby said vacuum cups are adapted to selectively apply a vacuum.

3. An end effector for a robot, comprising:
   a plate mounted to said end effector, said plate having a first surface and an oppositely positioned second surface;
   a vacuum port located on the first surface of the plate and passing through the plate to the second surface, said vacuum port being connected to a vacuum source;
   a surround located on the second surface of the plate, said surround enveloping the vacuum port at the second surface of the plate;
   a first gripping element mounted to the second surface in substantially perpendicular relationship to the plate, said first gripping element being located outboard the surround;
   a second gripping element positioned in space parallel relation opposite the first gripping element whereby said second gripping element is located outboard the surround; and
   a plurality of piercing points, said points being retractably mounted to the plate.

4. An end effector according to claim 3 further comprising a plurality of suction cups located on said plate, and wherein said plate is mounted in substantial perpendicular relationship to the end effector; and wherein said suction cups on said plate have means for drawing vacuum.

5. An end effector for a robot for manipulating a container, said effector comprising:
   a vacuum plenum comprising a mounting plate, a surround mounted to said plate, a port passing through said plate, and a means for drawing vacuum connected to said port;
   a first gripping element mounted to the plate outboard of said surround, said first gripping element comprising a stationary blade having a smooth surface, said stationary blade being rigidly mounted generally perpendicularly to the plate; and
   a second gripping element comprising a movable blade having a smooth surface, said movable blade being movably mounted generally perpendicular to the plate outboard of said surround, and wherein said movable blade is positioned opposite the first gripping element; and
   a plurality of piercing points, each said point having a barbed portion, said points being retractably mounted to the plate, whereby the plurality of points are adapted to pierce a container.

* * * * *